United States Patent [19]
Shinohara et al.

[11] Patent Number: 5,580,473
[45] Date of Patent: Dec. 3, 1996

[54] METHODS OF REMOVING SEMICONDUCTOR FILM WITH ENERGY BEAMS

[75] Inventors: Wataru Shinohara; Yasuaki Yamamoto; Hiroshi Hosokawa, all of Moriguchi, Japan

[73] Assignee: Sanyo Electric Co. Ltd., Moriguchi, Japan

[21] Appl. No.: 262,240

[22] Filed: Jun. 20, 1994

[30] Foreign Application Priority Data

Jun. 21, 1993 [JP] Japan ..................................... 5-149022

[51] Int. Cl.⁶ .................................................. B23K 26/00
[52] U.S. Cl. .............................. 219/121.69; 219/121.76; 437/173; 437/2; 437/4; 136/244
[58] Field of Search ......................... 219/121.67, 121.68, 219/121.69, 121.72, 121.76, 121.77, 121.85, 121.2, 121.19, 121.66; 156/643, 643.1; 427/554, 555, 556; 437/173, 2, 4; 136/244; 216/65, 94; 264/400; 250/492.1; 148/525, 565

[56] References Cited

U.S. PATENT DOCUMENTS 4,650,524  3/1987  Kiyama et al. .
4,723,062  2/1988  Nishioka et al. ................... 219/121.69
4,877,481  10/1989  Fukuda et al. .
4,877,939  10/1989  Duley et al. ......................... 219/121.68
5,235,154  8/1993  Economikos ....................... 219/121.69

FOREIGN PATENT DOCUMENTS 213556      9/1984   Germany ........................... 219/121.67
4215561     5/1993   Germany ........................... 219/121.67
59-25380    6/1984   Japan ................................... 219/121.85
59-31983    8/1984   Japan ................................... 219/121.69
2-263590   10/1990   Japan ................................... 219/121.67

OTHER PUBLICATIONS

Shaw, A. S. et al. "Two-pass laser Cutting." IBM Technical Disclosure Bulletin, vol. 16, No. 10 (Mar. 1974, p. 3237.

*Primary Examiner*—Teresa J. Walberg
*Assistant Examiner*—Gregory L. Mills
*Attorney, Agent, or Firm*—W. G. Fasse; W. F. Fasse

[57] ABSTRACT

A method of removing a prescribed portion of a semiconductor film or a metal film involves irradiating the prescribed portion to be removed with a first energy beam, and then with a second energy beam. The energy densities and beam widths of the first and second energy beams are each separately controlled or selected to avoid damaging an underlayer under the film and to reduce or avoid deformation of a periphery around the removed portion.

10 Claims, 9 Drawing Sheets

COMPARATIVE EXAMPLE 1 — ENERGY DENSITY 0.321J/cm²

COMPARATIVE EXAMPLE 2 — ENERGY DENSITY 0.442J/cm²

COMPARATIVE EXAMPLE 3 — ENERGY DENSITY 0.447J/cm²

COMPARATIVE EXAMPLE 4 — ENERGY DENSITY 0.614J/cm²

PRIOR ART

FIG. 14A

PRIOR ART

FIG. 14B

METHODS OF REMOVING SEMICONDUCTOR FILM WITH ENERGY BEAMS

BACKGROUND OF THE INVENTION

1. Field of the Invention

The present invention relates to a method of removing a semiconductor film or a metal film by irradiating the same with an energy beam. The present method is applicable to a method of fabricating a photovoltaic element.

2. Description of the Background Art

In a method of fabricating a semiconductor device such as a photovoltaic element, an energy beam such as a laser beam is partially applied to a semiconductor film for removing a fine region thereof. In such a film removal process, the semiconductor film is irradiated with an energy beam having an energy density exceeding the binding energy of the components forming the semiconductor film. It is possible to remove the semiconductor film in a prescribed pattern by scanning the film with a spot-type energy beam or a linear energy beam.

In the semiconductor device such as a photovoltaic element, the semiconductor film may be formed on a metal film. When such a semiconductor film is irradiated with an energy beam such as a laser beam for removing the film, the following problem arises. There are threshold values with respect to energy density in relation to film removal using an energy beam, and the semiconductor film has a higher threshold value than the metal film. Thus, when the semiconductor film that has been formed on the metal film is irradiated with an energy beam having an energy density lower than the threshold value of the semiconductor film, the semiconductor film cannot be removed. On the other hand, when the semiconductor film is irradiated with an energy beam having an energy density higher than its threshold value, the semiconductor film will be removed but the metal film serving as an underlayer will also inevitably be removed at the same time.

In a step of fabricating a semiconductor device such as a photo-voltaic element, an energy beam such as a laser beam is partially applied to a metal film, i.e. applied to a portion of the metal film, for removing a fine region thereof. In such film removal by irradiation with an energy beam, it is possible to remove the metal film in a prescribed pattern by scanning the film with a spot-type energy beam or a linear energy beam.

Figure 14A:
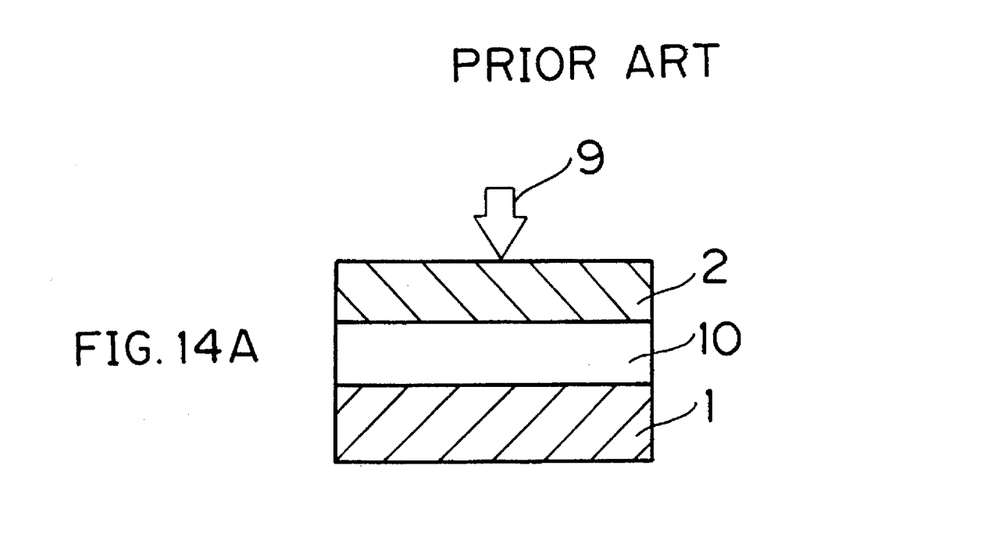
FIGS. 14A and 14B are sectional views showing a conventional method of removing a metal film.
Figure 14B:
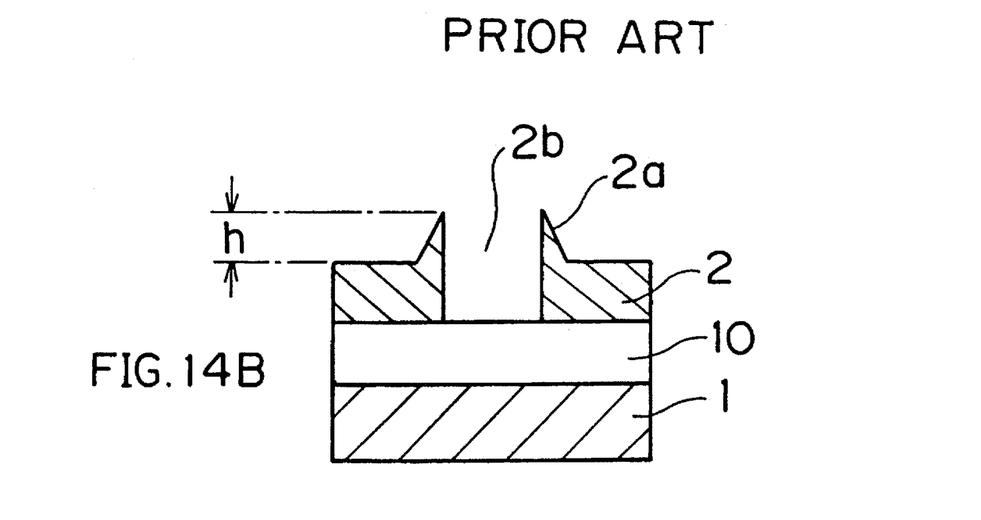

FIGS. 14A and 14B are sectional views showing a conventional method of removing a metal film. Referring to FIG. 14A, a polymer thin film 10 of polyimide resin or the like is formed on a substrate 1 of glass or the like, and a metal film 2 of Al or the like is formed on the polymer thin film 10. Such a layered structure of the metal film 2 is employed in a photovoltaic element, for example. A laser beam 9 emitted from an XeCl excimer laser, for example, is employed as an energy beam for removing the metal film 2. The metal film 2 is irradiated with the laser beam 9, and is thereby partially removed.

Referring to FIG. 14B, the metal film 2 has been irradiated with the laser beam 9, which has formed a removed portion 2b. While forming the removed portion 2b, a deformed portion such as a projection 2a is formed on a peripheral region of the removed portion of the metal film 2, due to thermal deformation or the like. Such a projection 2a leads to the separation of a semiconductor thin film or the like that is to be stacked on the metal film 2, or to the formation of pinholes and electric leakage and the like in the semiconductor thin film.

SUMMARY OF THE INVENTION

It is an object of the present invention to provide a method that can remove only a semiconductor film without negatively influencing an underlayer.

Another, object of the present invention is to provide a method that can remove a portion of a metal film by irradiating it with an energy beam, without forming a deformed portion such as a projection in a peripheral region of the removed portion.

Still another object of the present invention is to provide a method of fabricating a photovoltaic element through the aforementioned removing method.

A method of removing a semiconductor film according to the present invention is characterized in that a portion of the semiconductor film to be removed is irradiated with a first energy beam and thereafter irradiated with a second energy beam having an energy density different from that of the first energy beam.

According to a first aspect of the present invention, the method comprises a step of irradiating a portion of a semiconductor film to be removed for distorting the portion, and a step of irradiating the distorted portion with a second energy beam for removing the same.

According to the first aspect of the present invention, the portion to be removed of the semiconductor film is irradiated with energy beams a plurality of times, and is thereby removed. The semiconductor film to which the present invention is applied is not restricted in particular, but the invention is applicable to a film of a semiconductor such as silicon or a compound semiconductor such as GaAs which is in an amorphous, microcrystalline, polycrystalline or single-crystalline state. The present invention can be particularly preferably applied to an amorphous semiconductor film, because it is possible to crystallize this film and remarkably distort its portion to be removed by irradiating that portion with an energy beam. The semiconductor film which is removed by irradiation with laser beams is generally 0.1 to 1000 μm in thickness.

According to the first aspect of the present invention, the semiconductor film is irradiated with energy beams at least twice so that a prescribed region thereof is removed. The portion to be removed is thermally distorted by irradiation with the first energy beam, and then removed by irradiation with the second energy beam.

Figure 1A:
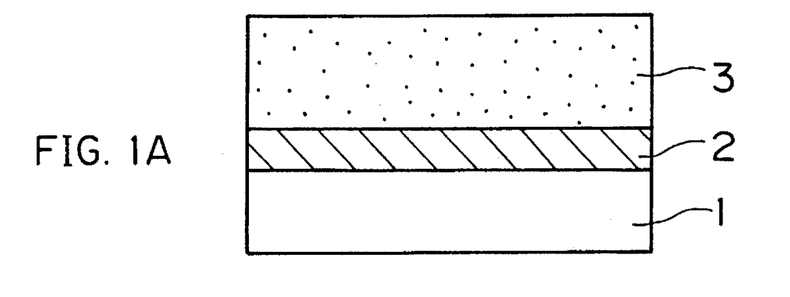
FIGS. 1A, 1B and 1C respectively show cross-sections of a semiconductor film in a state not yet irradiated with energy beams, a state irradiated with a first energy beam and a state irradiated with a second energy beam, for illustrating a method of removing a semiconductor film according to a first aspect of the present invention.
Figure 1B:
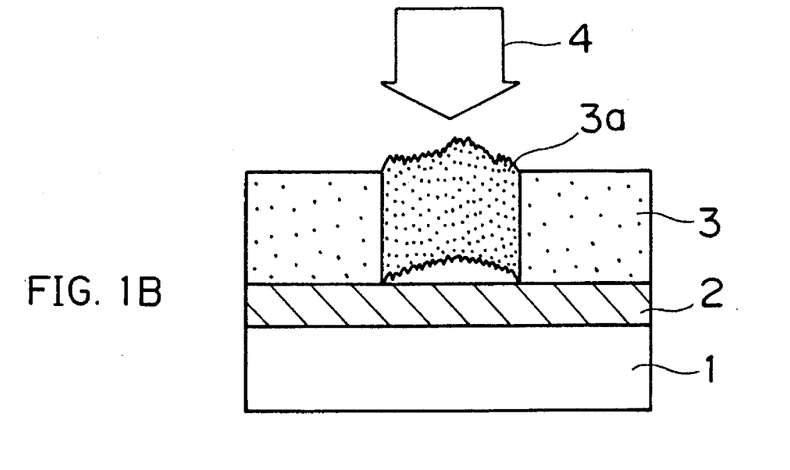
Figure 1C:
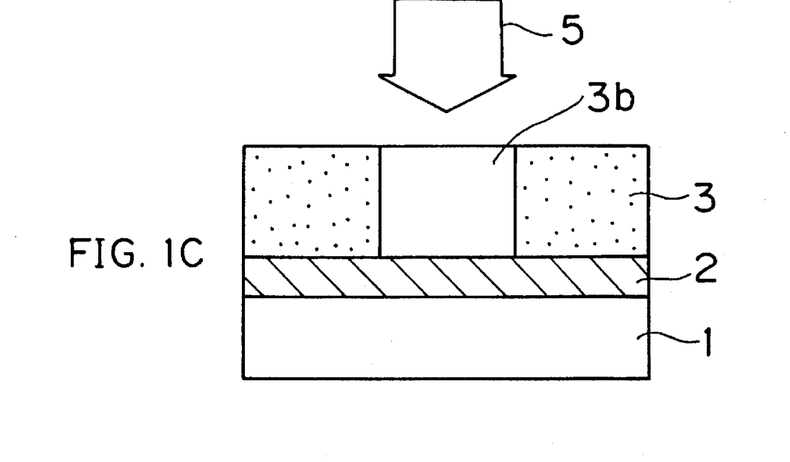

The method according to the first aspect of the present invention will now be described with reference to FIGS. 1A to 1C. Referring to FIG. 1A, a metal film 2 is provided on a substrate 1, and a semiconductor film 3 of amorphous silicon is provided on the metal film 2. As shown in FIG. 1B, the semiconductor film 3 is irradiated with a first laser beam 4 of prescribed energy density. It is inferred that a region 3a of the semiconductor film 3 irradiated with the laser beam 4 is crystallized and stress is caused by the resulting change in lattice constant, so that this region 3a is separated from the metal film 2 which serves as an underlayer, as shown in FIG. 1B. The irradiated region 3a thus puckers up and defines a small space between the same and the metal film 2. The region 3a is then irradiated with a second laser beam 5 of prescribed energy density, as shown in FIG. 1C. The region 3a thus irradiated with the second laser beam 5 is removed, to define a removed portion 3b as shown in FIG. 1C.

According to the first aspect of the present invention, as hereinabove described, the region irradiated with the first energy beam is distorted and reduced in adhesion to the metal film underlayer, in some mode. The irradiated region which has thus been reduced in adhesion is then irradiated with the second energy beam, whereby only this region of the semiconductor film can be removed without damaging the metal film underlayer.

The energy density values of the energy beams that are applied according to the first aspect of the present invention can be properly selected in consideration of the material and the thickness of the semiconductor film that is to be irradiated with the energy beams. The energy density values are separately selected for the first energy beam for distorting the semiconductor film and the second energy beam for removing the portion to be removed. In order to remove an amorphous silicon thin film of about 0.1 to 1000 μm in thickness, the first energy beam for distorting the film portion preferably has an energy density of 0.01 to 1.0 J/cm$^2$, more preferably 0.05 to 0.5 J/cm$^2$. The second energy beam for removing the semiconductor film portion preferably has an energy density of 0.1 to 10 J/cm$^2$, more preferably 0.5 to 2 J/cm$^2$. While the second energy beam generally has higher energy density than the first energy beam, these energy beams can be at the same energy density values or the energy density of the first energy beam can be set to be higher than that of the second energy beam as needed.

The energy beams generally have wavelengths of not more than 0.5 μm, and generally in a range of 0.19 to 0.35 μm when the beams are emitted from lasers serving as beam sources.

A method of removing a metal film according to the present invention is characterized in that a portion to be removed of the metal film is irradiated with a first energy beam and thereafter irradiated with a second energy beam having an energy density different from that of the first energy beam. Alternatively, after the irradiation with the first energy beam, a narrower region within the region irradiated with the first energy beam or a wider region including the region irradiated with the first energy beam is irradiated with a second energy beam.

In the inventive method, when the region irradiated with the second energy beam is narrower or wider than the region irradiated with the first energy beam, the energy density values of the first energy beam and the second energy beam may be substantially equal to each other, or may be different from each other.

According to a second aspect of the present invention, the method comprises a step of irradiating a prescribed portion to be removed of a metal film with a first energy beam for altering the portion to be removed, and a step of irradiating the portion to be removed with a second energy beam for removing the same.

According to the second aspect of the present invention, the metal film is irradiated with the first energy beam, which has a low energy and does not cause removal of the metal film. Thus, the metal film is subjected to heat treatment such as annealing or quenching, and altered to hardly cause deformation or the like during removal. After such alteration, the metal film is irradiated with the second energy beam having a higher energy so that the portion is removed. The removed region is preferably inside the portion irradiated with the first energy beam, and this region is irradiated with the second energy beam to be removed. Since the already altered region of the metal film is removed, a de formed portion such as a projection is hardly caused.

According to the second aspect of the present invention, the first energy beam preferably has an energy density of 0.01 to 0.5 J/cm$^2$, more preferably 0.05 to 0.2 J/cm$^2$. The second energy beam preferably has an energy density of 0.2 to 1.5 J/cm$^2$, more preferably 0.2 to 1 J/cm$^2$.

In the second aspect, when the region irradiated with the second energy beam is narrower than the region irradiated with the first energy beam, the energy density values of the first energy beam and the second energy beam may be substantially equal to each other, or may be different from each other.

According to a third aspect of the present invention, the method comprises a step of irradiating a portion to be removed of a metal film with a first energy beam for removing the portion, and a step of irradiating a peripheral region of the removed portion with a second energy beam for flattening a deformed portion of the peripheral region.

According to the third aspect of the present invention, the metal film is irradiated with the first energy beam to be removed similarly to the prior art. Then, a deformed portion of the peripheral region of the removed portion defined by the irradiation with the first energy beam is irradiated with the second energy beam so that the deformed portion is flattened by melting.

According to the third aspect of the present invention, the first energy beam preferably has an energy density of 0.2 to 1.5 J/cm$^2$, more preferably 0.2 to 1 J/cm$^2$. The second energy beam preferably has an energy density of 0.1 to 0.9 J/cm$^2$, more preferably 0.3 to 0.6 J/cm$^2$.

In the third aspect, when the region irradiated with the second energy beam is wider than the region irradiated with the first energy beam, the energy density values of the first energy beam and the second energy beam may be substantially equal to each other, or may be different from each other.

In the method of removing a metal film according to the second or third aspect of the present invention, no deformed portion such as a projection remains in the peripheral region of the removed portion. Thus, no problems of separation, pinholes or electric leakage will be caused in a semiconductor thin film that is formed on the metal film.

A method of fabricating a photovoltaic element according to the present invention employs the aforementioned method of removing a metal film according to the present invention. The inventive method of fabricating a photovoltaic element is adapted to fabricate a photovoltaic element comprising partially removed metal and semiconductor films stacked on a substrate. This method comprises a step of forming a metal film on a substrate, a step of irradiating a portion to be removed of the metal film with a first energy beam and thereafter irradiating the same with a second energy beam having an energy density different from that of the first energy beam for removing the portion to be removed, or thereafter irradiating with a second energy beam a narrower region within the region irradiated with the first energy beam or a wider region including the region irradiated with the first energy beam. The method further includes a step of forming a semiconductor film on the metal film having the removed portion, and a step of irradiating a portion to be removed of the semiconductor film with the first energy beam and thereafter irradiating the portion with the second energy beam having an energy density different from that of the first energy beam for removing the portion.

The steps of the method of removing a semiconductor film according to the first aspect of the present invention can be employed in the step of removing the semiconductor film in the inventive fabrication method. The steps of the method of removing a metal film according to the second or third aspect of the present invention can be employed in the step of removing the metal film in the inventive fabrication method.

The energy density values of the energy beams applied in the present invention can be properly selected in consideration of the materials and the thicknesses of the metal film and the semiconductor film to be irradiated with these energy beams.

According to the inventive fabrication method, it is possible to remove the metal film without leaving a deformed portion such as a projection, whereby the semiconductor film formed thereon will not be subjected to separation and the occurrence of pinholes or electric leakage. Further, only a portion to be removed of the semiconductor film can be removed without exerting any bad influence on the metal film serving as an underlayer.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS AND BEST MODE OF THE INVENTION

Metal films of 2000 Å in thickness were formed on polyimide substrates, and amorphous silicon thin films of 6000 Å in thickness were formed on these metal films. Then the silicon films were irradiated with laser beams emitted from an XeCl excimer laser, whereby prescribed portions of the silicon films were removed.

EXAMPLE 1

Figure 2:
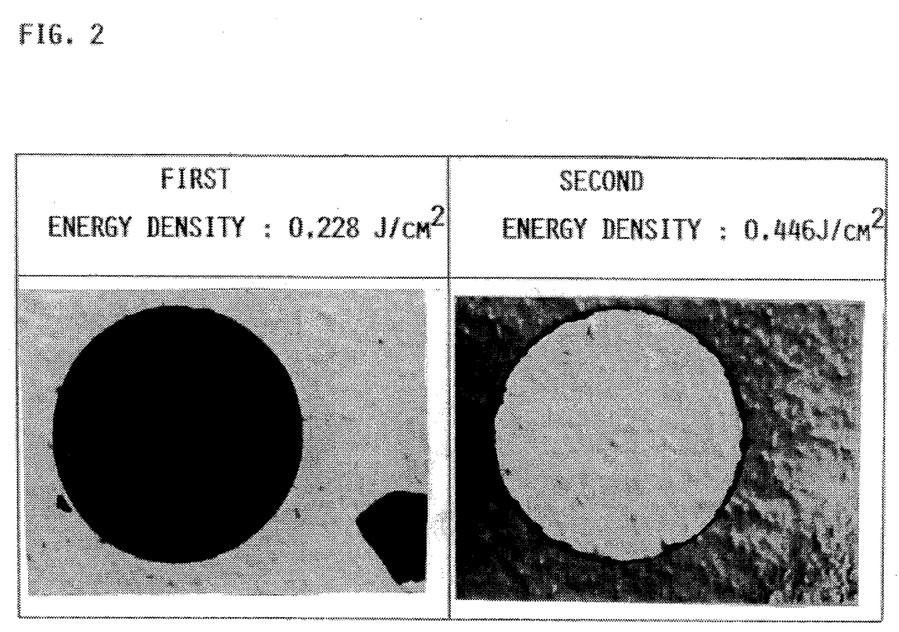
FIG. 2 shows microphotographs showing surface states of a thin film irradiated with laser beams in an example 1 according to the first aspect of the present invention.

A portion to be removed of an inventive sample was irradiated with energy beams twice according to the present invention. First and second laser beams were applied at energy density levels of 0.228 J/cm$^2$ and 0.446 J/cm$^2$ respectively. States of the surface irradiated with the first and second laser beams were observed with a microscope respectively. Table 1 shows the results. FIG. 2 shows the surfaces observed with the microscope.

TABLE 1

|  | Energy Density (J/cm$^2$) | Result of Observation |
| --- | --- | --- |
| Example 1 | First: 0.228 | a-Si was homogeneously altered. |
|  | Second: 0.446 | a-Si was removed with no damage of metal film. |

COMPARATIVE EXAMPLES 1 TO 4

Figure 3:
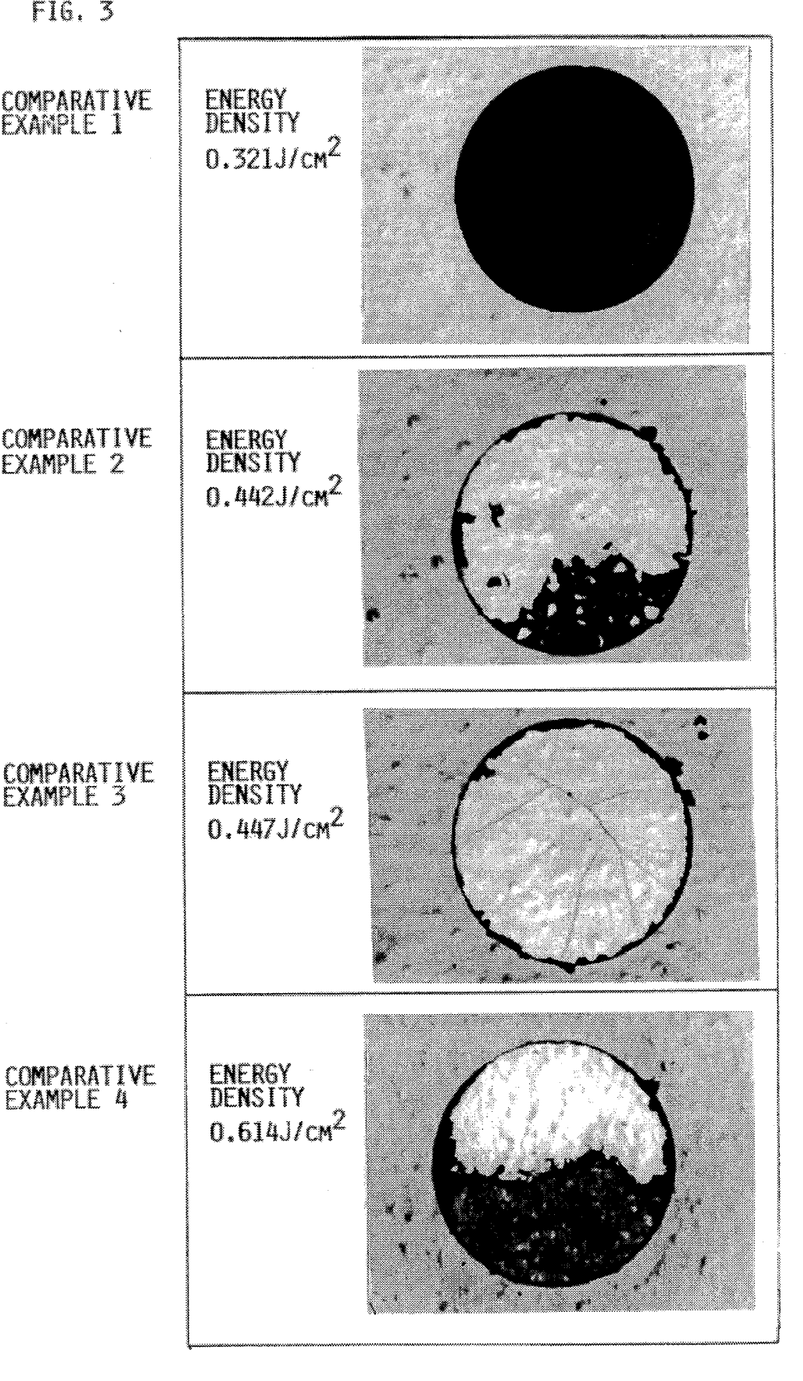
FIG. 3 shows microphotographs showing surface states of thin films irradiated with laser beams according to four comparative examples.

Amorphous silicon thin films of comparative samples were irradiated with laser beams at different energy density levels. States of the irradiated surfaces were observed with a microscope. Table 2 shows the results. Referring to Tables 1 and 2, "a-Si" indicates the amorphous silicon thin films. FIG. 3 shows the surfaces of the comparative examples observed with the microscope.

TABLE 2

|  | Energy Density (J/cm$^2$) | Result of Observation |
| --- | --- | --- |
| Comparative Example |  |  |
| 1 | 0.321 | a-Si was altered. |
| 2 | 0.442 | a-Si remained. |
| 3 | 0.447 | a-Si was substantially removed to expose metal film, which was already cracked. |
| 4 | 0.614 | Metal film was partially removed, to expose polyimide. |

According to the present invention, it is possible to remove an amorphous silicon thin film without damaging a metal film serving as an underlayer by first distorting the amorphous silicon thin film by irradiation with a first laser beam and then removing the same by irradiation with a second laser beam, as clearly understood from Table 1 and FIG. 2. As understood from Table 2 and FIG. 3, on the other hand, it is difficult to remove only an amorphous silicon thin film by irradiating the same with a laser beam only once while selecting or adjusting the energy density, due to partial residue of the amorphous silicon thin film or cracking of a metal film serving as an underlayer.

While the above Example has been described with reference to an amorphous silicon thin film as the semiconductor film, the present invention is not restricted to such an amorphous silicon thin film but is also applicable to a film of a compound semiconductor such as GaAs, or to microcrystalline, polycrystalline or single crystalline silicon.

While the above Example has been described with reference to a method of removing a semiconductor film formed on a metal film, the present invention is not restricted to such removal of a semiconductor film formed on a metal film.

According to the first aspect of the present invention, a semiconductor film to be removed in the form of a line may be linearly scanned with a spot-type energy beam, or irradiated with a sheet- or line-type energy beam. Further, the semiconductor film may be simultaneously scanned with a plurality of energy beams which are arranged along the direction of scanning.

According to the first aspect of the present invention, further, the number of times of irradiation with the first or second energy beam is not restricted to once, but rather each of the first and second energy beams can be applied a plurality of times.

Figure 4A:
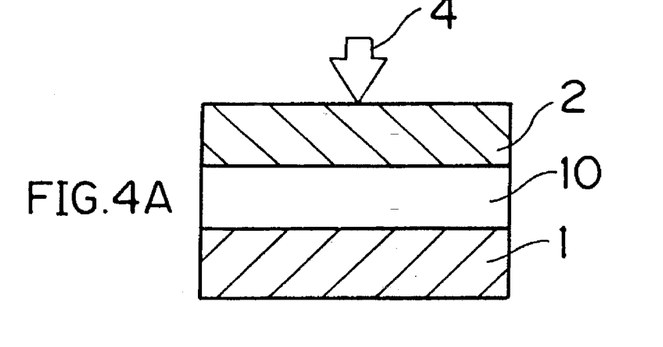
FIGS. 4A to 4C are sectional views showing successive steps in an embodiment of a removing method according to a second aspect of the present invention.

FIGS. 4A to 4C are sectional views showing an embodiment according to a second aspect of the present invention. Referring to FIG. 4A, a polymer thin film of poiyimide resin or the like is formed on a substrate 1 of glass, SUS stainless steel, or the like. A metal film 2 of Al or the like having a thickness of 0.1 to 0.3 µm is formed on the polymer thin film 10. In this embodiment, the thickness is 0.2 µm. This metal film 2 is irradiated with a laser beam 4 having an energy density of 0.10 J/cm$^2$ and being emitted from an XeCl excimer laser.

Figure 4B:
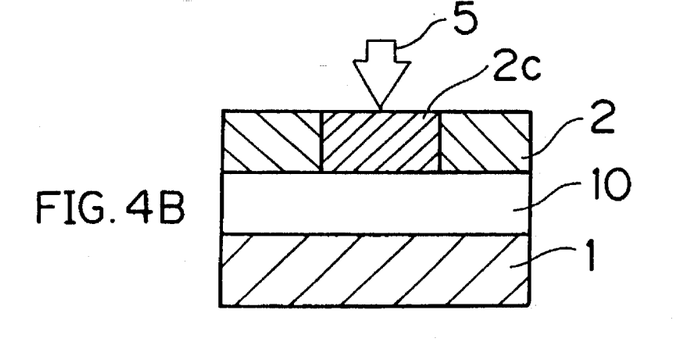

Referring to FIG. 4B, the region of the metal film 2 irradiated with the laser beam 4 defines an altered region 2c. In this embodiment, the region irradiated with the first laser beam 4 that is the altered region 2c, has a width of 100 µm. This region 2c has been altered by annealing or quenching with the laser beam 4. Then, an inner region of the altered region 2c, e.g. a region narrower than and substantially concentric with the region 2c, is irradiated with another laser beam 5 having an energy density of 0.90 J/cm$^2$. This laser beam 5 is also emitted from an XeCl excimer laser.

Figure 4C:
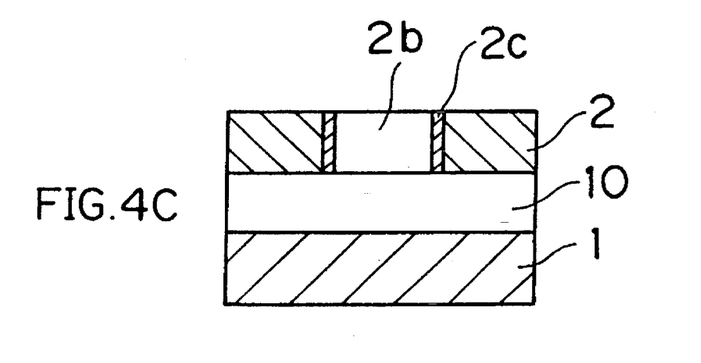

Referring to FIG. 4C, the metal film 2 is removed in the narrower, inner region of the altered region 2c irradiated with the laser beam 5, to define a removed portion 2b. In this embodiment, the region irradiated with the second laser beam 5, that is the removed portion 2b, has a width of 50 µm.

In practice, no remarkable deformation was recognized in a peripheral region around the removed portion 2b but this region merely projected slightly from the surface of the metal film 2 by about 0.10 µm. For the purpose of comparison, a metal film 2 was irradiated with a laser beam 9 in the conventional method shown in FIGS. 14A and 14B, and the height $\underline{h}$ of a deformed portion 2a was measured. The height $\underline{h}$ of the deformed portion 2a was 0.90 µm when the energy density of the laser beam 9 was 0.30 J/cm$^2$. Such deformed portions 2a exhibited heights $\underline{h}$ of 0.75 µm, 0.80 µm and 0.75 µm when using laser beams 9 of energy density levels of 0.60 J/cm$^2$, 0.90 J/cm$^2$, and 1.20 J/cm$^2$, respectively.

According to the second aspect of the present invention, as hereinabove described, it is possible to reduce deformation around the peripheral region of a portion removed by irradiation with a laser beam.

Figure 5A:
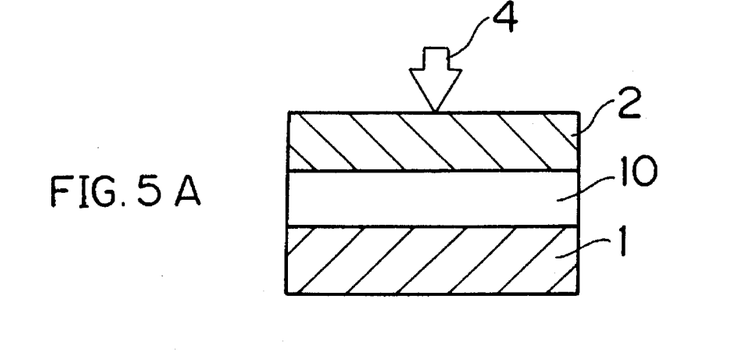
FIGS. 5A to 5C are sectional views showing successive steps in an embodiment of a removing method according to a third aspect of the present invention.

FIGS. 5A to 5C are sectional views showing an embodiment according to a third aspect of the present invention. Referring to FIG. 5A, a polymer thin film 10 is formed on a substrate 1 and a metal film 2 is formed on the polymer thin film 10, similarly to the embodiment shown in FIG. 4A. A region of the metal film 2 to be removed is irradiated with a laser beam 4 serving as a first energy beam. In practice, such a laser beam 4 was emitted from a YAG laser, with an energy density of 0.03 to 1 J/cm$^2$. In this embodiment, the energy density is 0.3 J/cm$^2$.

Figure 5B:
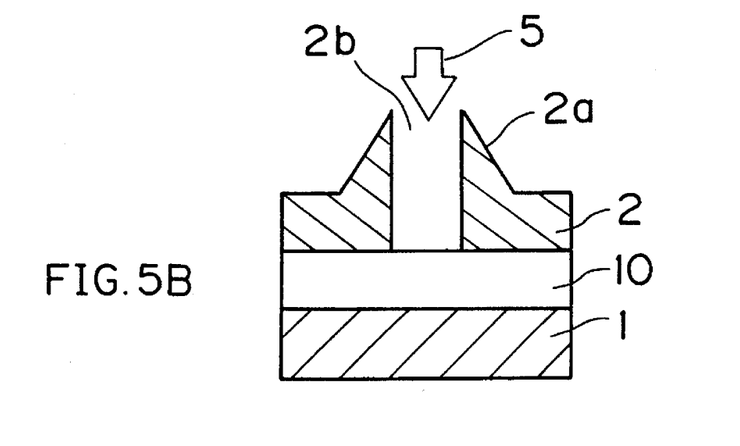

Referring to FIG. 5B, a removed portion 2b is defined in the metal film 2 by the irradiation with the laser beam 4. In a peripheral region around the removed portion 2b, further, the metal film 2 is partially raised up to define a deformed portion 2a. In practice, the removed portion 2b had a width of 30 µm, and the deformed portion 2a had a height $\underline{h}$ of 1.0 µm. Then, a wider region including the removed portion 2b and the deformed portion 2a is irradiated with another laser beam 5 emitted from a YAG laser. In practice, the laser beam 5 has an energy density of 0.5 J/cm$^2$. The region irradiated with the laser beam 5 is 50 µm in width.

Figure 5C:
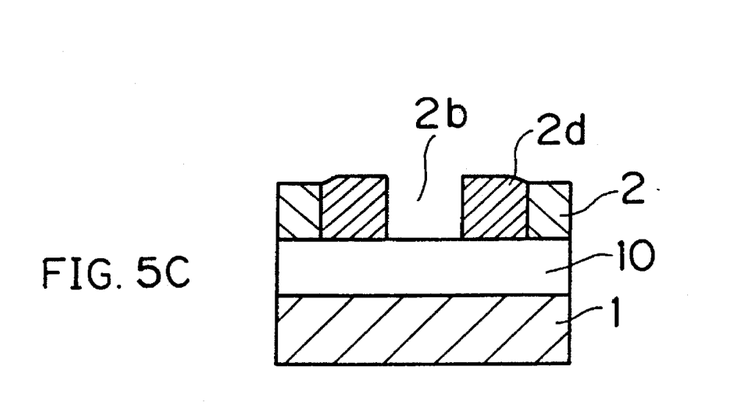

Referring to FIG. 5C, the deformed portion 2a around the peripheral region of the removed portion 2b is flattened to define a flattened region 2d. In practice, this flattened region 2b was raised up from the surface of the metal film 2 merely by about 0.1 µm.

According to the third aspect of the present invention, as hereinabove described, it is possible to reduce the degree of deformation of a deformed portion that is formed around the periphery of a portion that is removed by irradiation with a laser beam. In the inventive method of removing a metal film, the metal film to be removed in the form of a line may be linearly scanned with a spot-type energy beam, or irradiated with a line- or sheet-type energy beam. Further, the metal film may be simultaneously scanned with a plurality of energy beams which are arranged along the direction of scanning.

Figure 6:
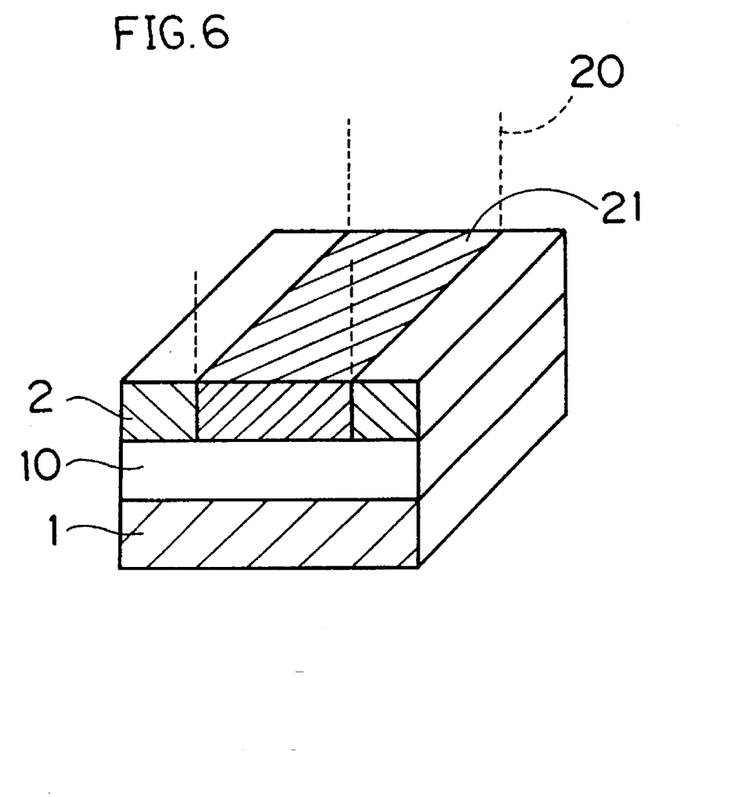
FIG. 6 is a perspective view showing a metal film irradiated with a first linear energy beam according to the present invention.
Figure 7:
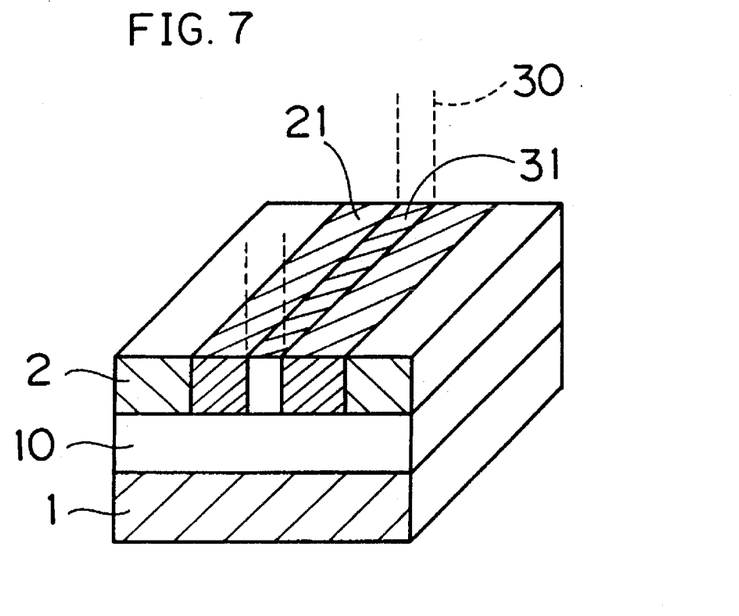
FIG. 7 is a perspective view showing the metal film of FIG. 6 further irradiated with a second linear energy beam according to the present invention.

FIGS. 6 and 7 show an embodiment of a method of removing a metal film through a sheet-type energy beam. Referring to FIG. 6, a metal film 2 is irradiated with a sheet-type energy beam 20. Thus, a linear altered region 21 is defined in the metal film 2.

Referring to FIG. 7, an inner region 31 of the linear altered region 21 is irradiated with a linear second energy beam 30. Thus, the inner region 31 of the altered region 21 is removed, to define a removed portion.

Figure 8:
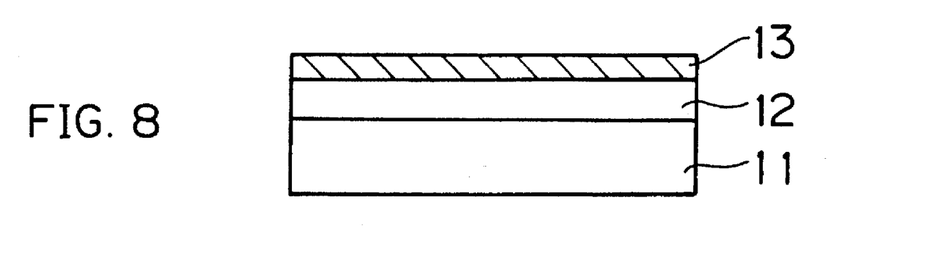
FIG. 8 is a sectional view showing a metal film formed in a step of fabricating a photovoltaic element according to the present invention.
Figure 9:
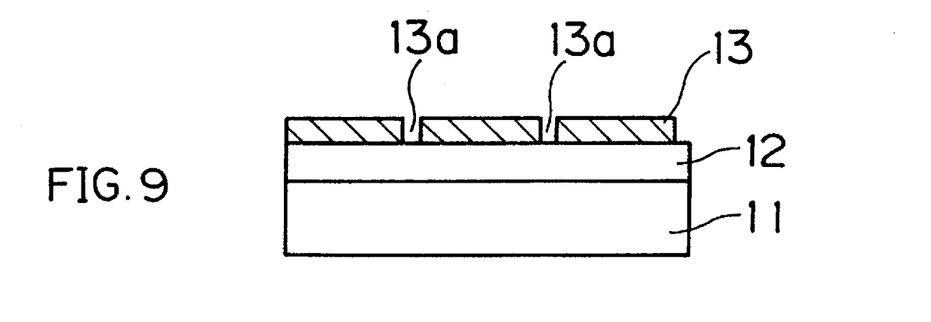
FIG. 9 is a sectional view showing the metal film of FIG. 8 partially removed in patterns according to the inventive removing method in a step of fabricating a photovoltaic element according to the present invention.

An embodiment of a method of fabricating a photovoltaic element according to the present invention will now be described. Referring to FIG. 8, an insulating film 12 made of an inorganic material such as SiO$_2$ or Al$_2$O$_3$, or an organic material such as polyimide, PMMA, or acrylate resin is formed on a substrate 11, and a metal film 13 made of Al, Ag, ITO, W, or a combination thereof is formed thereon. Referring to FIG. 9, the metal film 13 is removed by a method similar to that in the embodiment shown in FIGS. 4A to 4C in the form of lines at prescribed intervals to define removed portions 13a, so that the metal film 13 is divided into a plurality of sections. Alternatively, portions of the metal film 13 may be removed in the form of lines in a method similar to that in the embodiment shown in FIGS. 5A to 5C.

Figure 10:
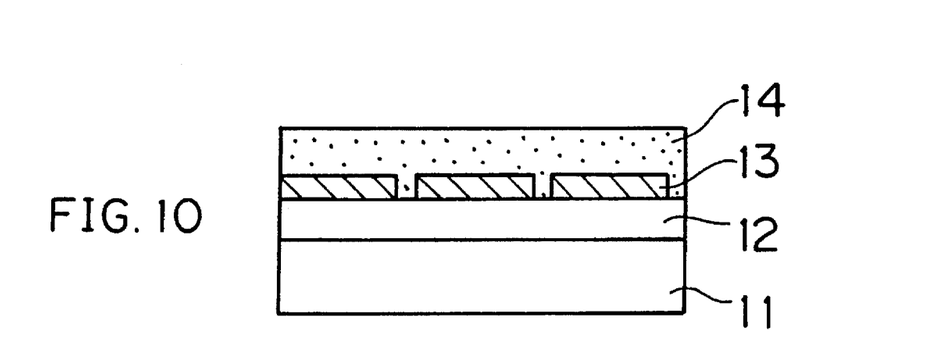
FIG. 10 is a sectional view showing an amorphous silicon thin film formed on the structure of FIG. 9 in a step of fabricating a photovoltaic element according to the present invention.

Referring to FIG. 10, an amorphous silicon thin film 14 having a p-n, p-i-n, n-p, or n-i-p junction is formed on the metal film 13, which has been divided into sections by the removal of line portions in the aforementioned manner. The amorphous silicon thin film 14 may have a multi-gap structure such as p-n-p-n-p-n . . . p-i-n-p-i-n-p-i-n . . . , n-p-n-p-n-p-n-p . . . , or n-i-p-n-i-p-n-i-p . . .

Figure 11:
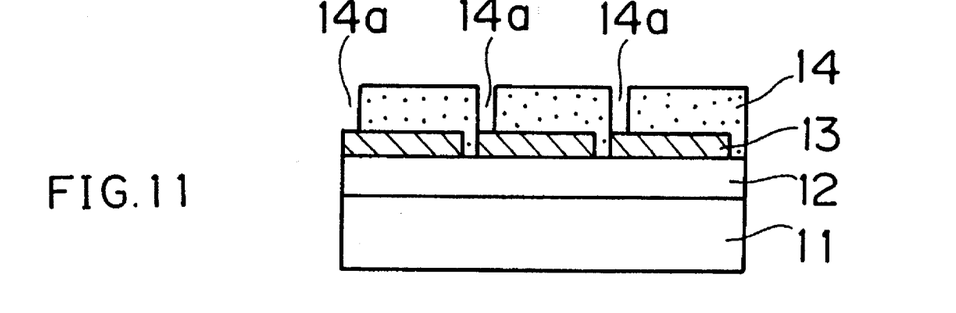
FIG. 11 is a sectional view showing the amorphous silicon thin film of FIG. 10 partially removed in patterns in a step of fabricating a photovoltaic element according to the present invention.

Referring to FIG. 11, the amorphous silicon thin film 14 is linearly irradiated with a first energy beam. The first energy beam is emitted from an XeCl excimer laser, for example. The amorphous silicon thin film 14 is distorted by the irradiation with the first energy beam. Due to such distortion, the adhesion of the amorphous silicon thin film 14 to the metal film 13 serving as an underlayer is reduced in some mode. Then, the irradiated region that has been reduced in adhesion is irradiated with a second energy beam. Portions of the amorphous silicon thin film 14 are removed by such irradiation with the second energy beam. Thus, linear removed portions 14a are defined in the amorphous silicon thin film 14. Since the amorphous silicon thin film 14 has first been distorted by the irradiation with the first energy beam and thus reduced in adhesion to the metal film 13 and has then been removed at prescribed portions, the metal film 13 serving as an underlayer is not damaged. In such a step of removing the semiconductor film, the first energy beam generally has an energy density of about 0.1 to 1.0 $J/cm^2$, for example. On the other hand, the second energy beam for removal of portions of the film generally has an energy density of about 0.1 to 10 $J/cm^2$. In practice, the first energy beam has an energy density of about 0.228 $J/cm^2$ while the second energy beam has an energy density of 0.446 $J/cm^2$.

Figure 12:
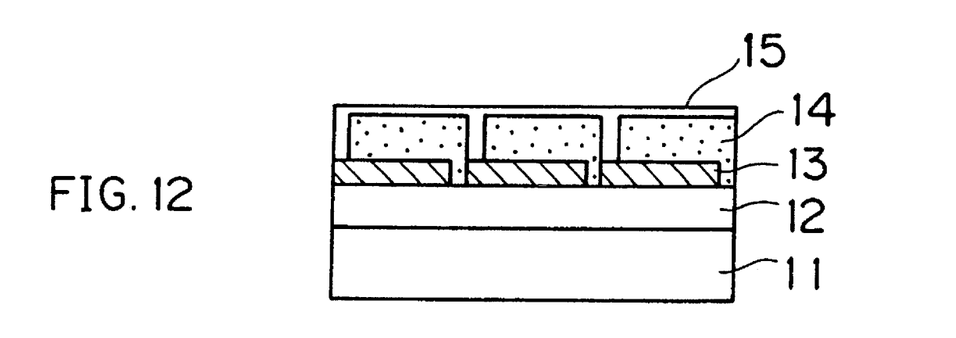
FIG. 12 is a sectional view showing a light-transmittant conductive film formed on the structure of FIG. 11 in a step of fabricating a photovoltaic element according to the present invention.

Referring to FIG. 12, a transparent conductive film 15 made of ITO, $SnO_2$, ZnO, or the like is formed on the amorphous silicon thin film 14.

Figure 13:
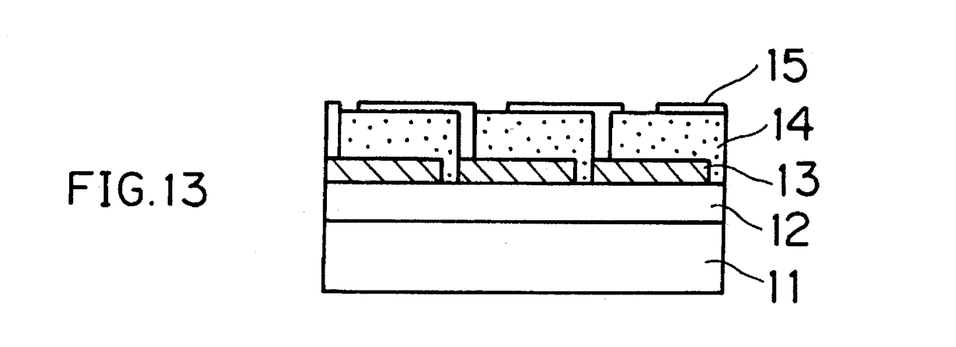
FIG. 13 is a sectional view showing patterns formed in the light-transmittant conductive film of FIG. 12 in a step of fabricating a photovoltaic element according to the present invention.

Referring to FIG. 13, the transparent conductive film 15 is irradiated with a laser beam to be linearly removed at prescribed portions and is thus divided into sections. Alternatively, removed portions of the film 15 may be defined and patterned by photoresist and etching.

Thus, it is possible to obtain a photovoltaic element having divided units that are connected in series with each other, as shown in FIG. 13.

According to the method of the aforementioned embodiment, it is possible to reduce the degree of deformation in a deformed portion such as a projection around the periphery of a removed portion in an operation of dividing a metal film by removing portions thereof. Thus, it is possible to prevent the occurrence of separation, pin holes and electric leakage in an amorphous silicon thin film which is formed on the metal film. Further, it is possible to prevent the metal film serving as an underlayer from being damaged in the operation of dividing the amorphous silicon thin film by removing portions thereof.

While each of the above embodiments has been described with reference to a metal film of Al, Ag, or the like, the present invention is not restricted thereto. Further, the present invention is also applicable to a compound semiconductor thin film of GaAs or the like, or a microcrystalline, polycrystalline or single-crystalline silicon thin film, although each of the above embodiments has been described with reference to an amorphous silicon thin film serving as the semiconductor film. The semiconductor film may have a multi-gap structure such as p-i-n-p-i-n-p-i-n-p-i-n . . . and n-i-p-n-i-p-n-i-p . . .

In the present invention, further, the number of times of irradiation with the first or second energy beam is not restricted to once but each of the first and second energy beams may be applied a plurality of times.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of removing at least a prescribed portion of an amorphous semiconductor film, comprising the steps of:

irradiating said prescribed portion of said semiconductor film with a first energy beam for distorting said prescribed portion by crystallizing amorphous semiconductor material at said prescribed portion; and irradiating said distorted prescribed portion with a second energy beam for removing said prescribed portion.

2. The method of claim 1, wherein each wavelength of said first energy beam and said second energy beam is not more than 0.5 μm.

3. The method of claim 1, wherein said first energy beam and said second energy beam have about the same beam width.

4. The method of claim 2, wherein said first energy beam has a lower energy density than does said second energy beam.

5. The method of claim 1, wherein said first energy beam has an energy density within the range of about 0.01 $J/cm^2$ to about 1.0 $J/cm^2$, and said second energy beam has an energy density within the range of about 0.1 $J/cm^2$ to about 10 $J/cm^2$.

6. The method of claim 1, wherein said first energy beam has an energy density within the range of about 0.05 $J/cm^2$ to about 0.5 $J/cm^2$, and said second energy beam has an energy density within the range of about 0.5 $J/cm^2$ to about 2.0 $J/cm^2$.

7. The method of claim 1, wherein said first energy beam has an energy density of about 0.228 $J/cm^2$, and said second energy beam has an energy density of about 0.446 $J/cm^2$.

8. The method of claim 1, wherein a metal underlayer arranged under said semiconductor film is undamaged by said steps of irradiating with said first and second energy beams.

9. The method of 8, wherein said distorting of said prescribed portion of said semiconductor film causes said prescribed portion to bulge away from and reduce adherence with said metal underlayer.

10. The method of claim 1, wherein said steps of irradiating with said first and second energy beams are repeated in succession a plurality of times.

* * * * *

UNITED STATES PATENT AND TRADEMARK OFFICE
CERTIFICATE OF CORRECTION

PATENT NO. : 5,580,473
DATED : Dec. 3, 1996
INVENTOR(S) : Shinohara et al.

It is certified that error appears in the above-indentified patent and that said Letters Patent is hereby corrected as shown below:

On the title page:

In [56] "OTHER PUBLICATIONS", replace "Shaw, A. S. et al." by --Shah, A. S. et al.--.

Column 10, claim 4, line 1, replace "claim 2," by --claim 1,--.

Signed and Sealed this

Sixth Day of May, 1997

Attest:

BRUCE LEHMAN

Attesting Officer   Commissioner of Patents and Trademarks